US010645099B1

(12) United States Patent
Ciubotariu

(10) Patent No.: US 10,645,099 B1
(45) Date of Patent: May 5, 2020

(54) MALWARE DETECTION FACILITATED BY COPYING A MEMORY RANGE FROM AN EMULATOR FOR ANALYSIS AND SIGNATURE GENERATION

(71) Applicant: CA, INC., San Jose, CA (US)

(72) Inventor: Mircea Ciubotariu, Culver City, CA (US)

(73) Assignee: CA, Inc., San Jose, CA (US)

(*) Notice: Subject to any disclaimer, the term of this patent is extended or adjusted under 35 U.S.C. 154(b) by 142 days.

(21) Appl. No.: 15/694,380

(22) Filed: Sep. 1, 2017

(51) Int. Cl.
*H04L 29/06* (2006.01)
*H04L 12/861* (2013.01)

(52) U.S. Cl.
CPC ........ *H04L 63/1416* (2013.01); *H04L 63/145* (2013.01); *H04L 49/90* (2013.01); *H04L 67/42* (2013.01)

(58) Field of Classification Search
CPC ... H04L 63/1416; H04L 63/145; H04L 49/90; H04L 67/42
See application file for complete search history.

(56) References Cited

U.S. PATENT DOCUMENTS 9,690,936 B1* 6/2017 Malik .................... G06F 21/562
9,900,324 B1* 2/2018 Barua .................... H04L 63/14
2012/0304244 A1* 11/2012 Xie ........................ G06F 21/00
726/1

* cited by examiner

*Primary Examiner* — Maung T Lwin
*Assistant Examiner* — Suman Debnath
(74) *Attorney, Agent, or Firm* — FisherBroyles, LLP

(57) ABSTRACT

API calls made by a code sample executing in an emulator are analyzed. Specific ones of the analyzed API calls are classified as meeting a threshold level of suspicion of being made by malware. In response to a specific API call being classified as meeting the threshold, a range of memory before and after the return address of the classified API call is copied to a buffer that is not accessible to the code sample. The copied range of memory in the buffer that is not accessible to the code sample is scanned, and a signature corresponding to the code sample is generated. The generated signature can be used for signature based malware detection, in order to detect one or more instances of malware. In response to detecting malware, one or more security actions can be performed.

20 Claims, 3 Drawing Sheets

MALWARE DETECTION FACILITATED BY COPYING A MEMORY RANGE FROM AN EMULATOR FOR ANALYSIS AND SIGNATURE GENERATION

TECHNICAL FIELD

This disclosure pertains generally to computer security, and more specifically to malware detection facilitated by copying a memory range from an emulator for analysis and signature generation.

BACKGROUND

Computers can be protected against a specific malware threat by identifying the threat through analysis, and generating an identifying signature. The signature can then be used to detect instances of the malware attempting to infect computer systems.

Modern malware typically runs in several stages. The first stage is generally an obfuscation layer that changes from sample to sample through the use of garbage code, which makes detection difficult. The second stage is usually a preparation layer, which makes preparation for the third and final stage, the payload. Although the first stage changes between instances and is designed to obfuscate the actual activities of the malware, the second stage does not change much, providing a good basis for generating a signature for detection. However, modern malware often specifically attempts to evade analysis of the preparation (second) stage and the generation of such a detection signature by wiping out the code and data of this stage, regardless of the whether the payload was executed or not.

It would be desirable to address these issues.

SUMMARY

Malware detection is facilitated by copying a memory range from an emulator to a buffer that is not accessible to the code sample, for analysis and signature generation. More specifically, a code sample executes in the emulator. Application Programming Interface ("API") calls made by the code sample executing in the emulator are analyzed. Specific ones of the analyzed API calls are classified as meeting a specific threshold level of suspicion of being made by malware. Such classification can be based on various factors, such as the API call being a low level memory allocation call, a low level memory mapping call, an imports resolution call, taking a data argument located in the code section (as opposed to the data section), transferring execution to an address located in a register rather than in memory, using a return address outside of the code section, etc. In some embodiments, classifications can be made based on combinations of multiple separate factors, which can be weighted as desired.

In response to a specific API call being classified as meeting the specific threshold level of suspicion, a range of memory before and after the return address of the classified API call is copied to a buffer that is not accessible to the code sample. Because the buffer resides out of the code sample's reach, it cannot be accessed by the code sample. The size of the memory range to copy is a variable design parameter (for example, 2K before and 2K after the return address). The copied range of memory in the buffer that is not accessible to the code sample is scanned, and a signature corresponding to the code sample is generated, based on scanned contents of the buffer. Where more than one API call is classified as being sufficiently suspicious, a separate memory range is copied for each specific separate one of the multiple API calls so classified, the buffer containing each separate copied range of memory is scanned, and a signature corresponding to the code sample is generated.

The generated signature can be used for signature based malware detection, in order to detect one or more instances of malware. For example, the generated signature can be checked against a database of signatures of known threats, and responsive to the generated signature matching an entry in the database, it can be determined that the code sample comprises malware. In another example, it can be determined that the code sample comprises malware, the generated signature can be used to identify additional instances of the malware, and can further be added to the database of signatures of known threats. In response to detecting malware, one or more security actions can be performed, such as quarantining the code sample, deleting the code sample, sending an alert to a user or administrator, sending a notification to a centralized computer security server, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
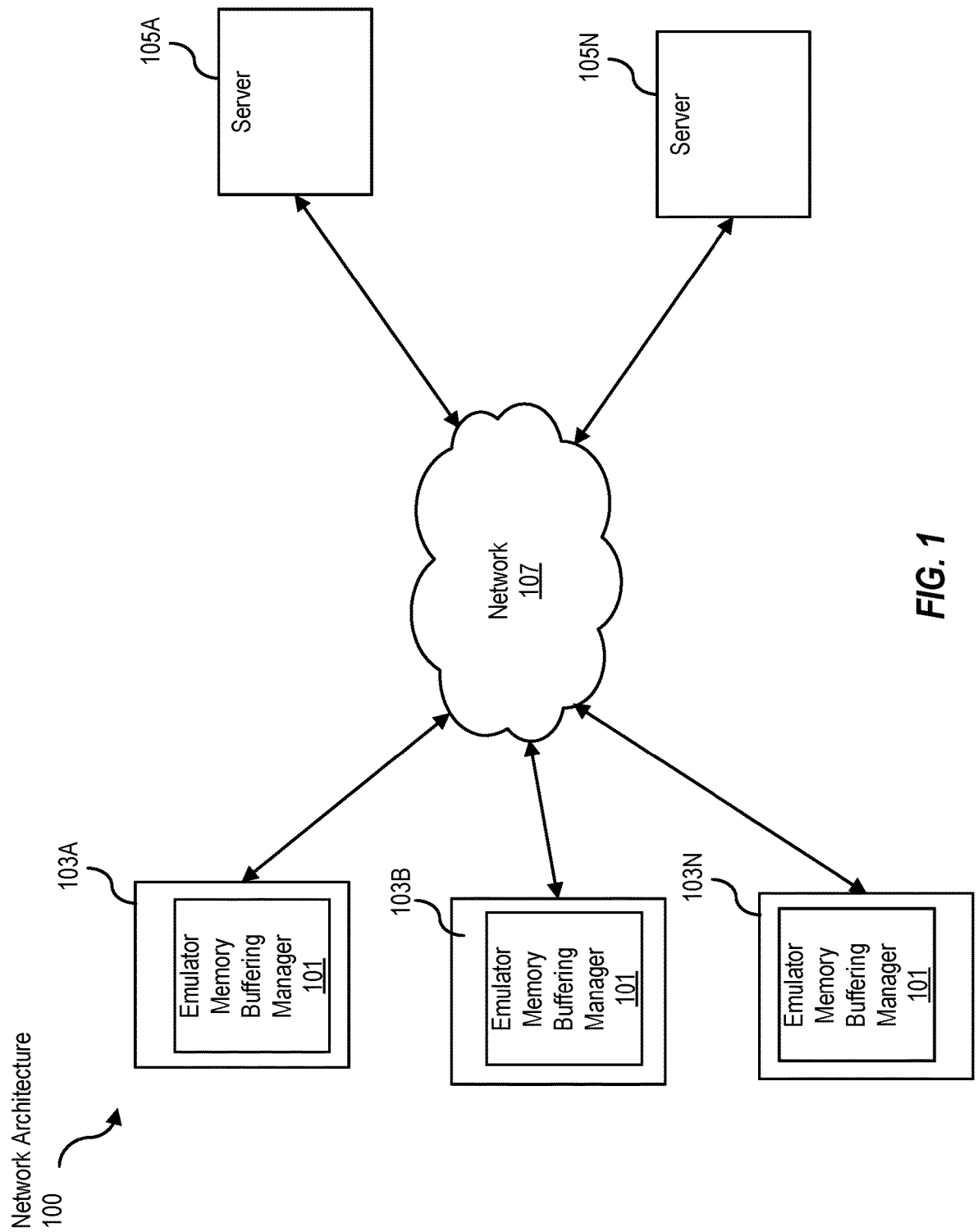
FIG. 1 is a block diagram of an exemplary network architecture in which an emulator memory buffering manager can be implemented, according to some embodiments.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Dynamic or behavioral malware analysis can be performed by observing the behavior of a code sample 301 while it is actually executing. This form of analysis is typically performed in an emulator 303 to prevent malware from infecting production systems. As noted above, modern malware can exhibit evasive techniques designed to defeat dynamic analysis, including wiping out the code and data of the preparation (second) stage, regardless of the whether or not the payload was executed. To defeat such evasive techniques, an emulator memory buffering manager 101 can operate in conjunction with the execution of code samples 301 in an emulator 303, as described in greater detail below. Malware typically makes one or more Application Programming Interface ("API") calls in preparation for the execution of the payload. Certain API calls are susceptible to being used in this context, and are thus indicative of the possibility that the calling code sample 301 is malicious. Where a given API call in a code sample 301 being executed in the emulator 303 meets a threshold level of suspicion, the emulator memory buffering manager 101 copies a range of memory 309 before and after the return address of the API call to a buffer 311 that is not accessible to the code sample 301, that is not accessible to the code sample 301. After the emulation has finished, the content of the buffer(s) 311 is scanned/analyzed. Because the code sample 301 cannot access the buffer 311, the memory in the buffer 311 cannot be wiped out to evade detection of suspicious activity and generation of a signature 327, as the memory in the emulator 303 itself can be. The buffered content is used to generate a signature 327, which can be used for signature based malware detection, and to take follow-up security actions, such as blocking a detected threat from executing, quarantining the threat, removing it from the computer system, alerting the user, sending an indication to a centralized security server 105, etc.

FIG. 1 is a block diagram illustrating an exemplary network architecture 100 in which an emulator memory buffering manager 101 can be implemented. The illustrated network architecture 100 comprises multiple clients 103A, 103B and 103N, as well as multiple servers 105A and 105N. In FIG. 1, an emulator memory buffering manager 101 is illustrated as residing on each client 103-103N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
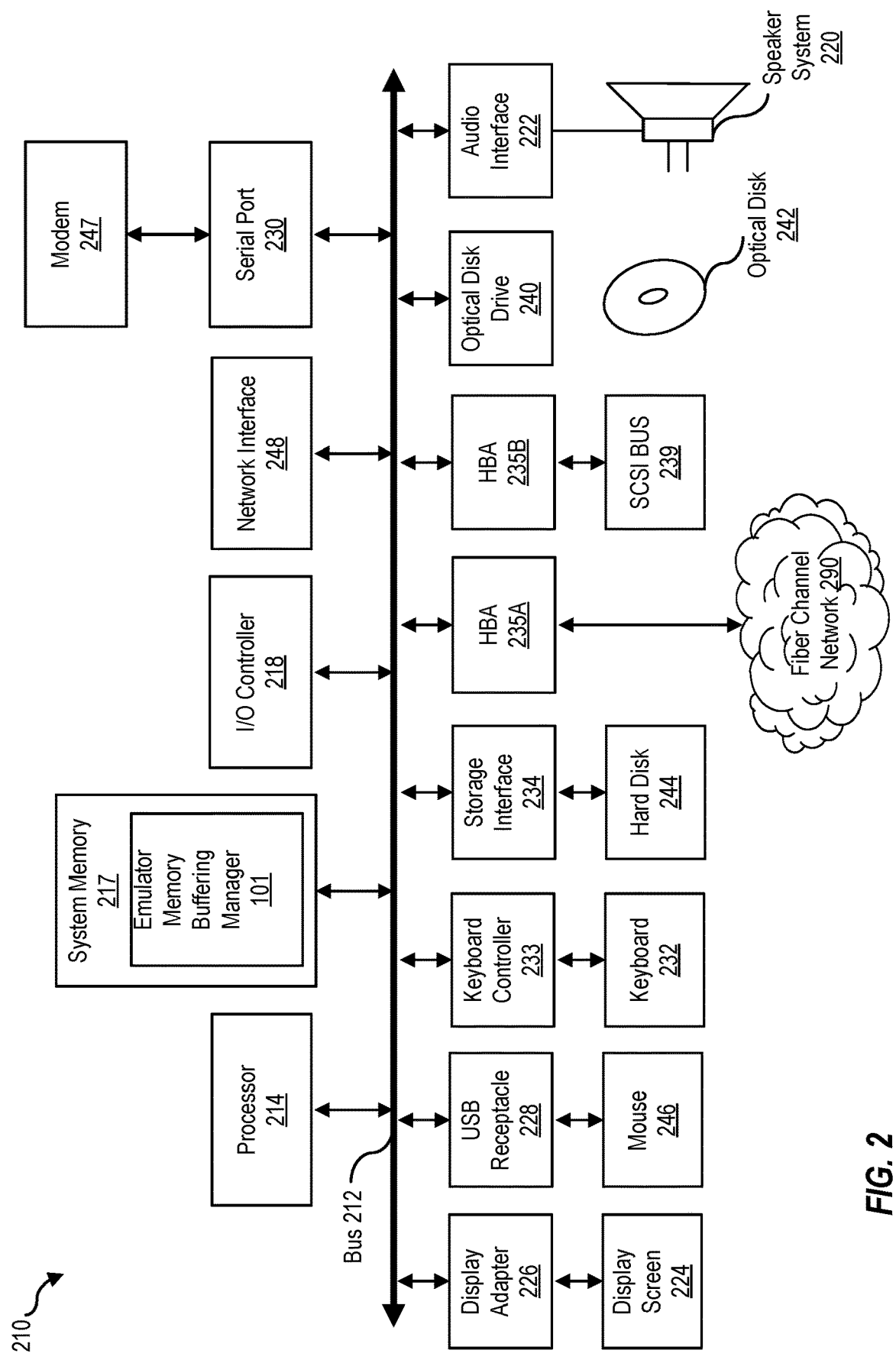
FIG. 2 is a block diagram of a computer system suitable for implementing an emulator memory buffering manager, according to some embodiments.

FIG. 2 is a block diagram of a computer system 210 suitable for implementing an emulator memory buffering manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the emulator memory buffering manager 101 is illustrated as residing in system memory 217. The workings of the emulator memory buffering manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
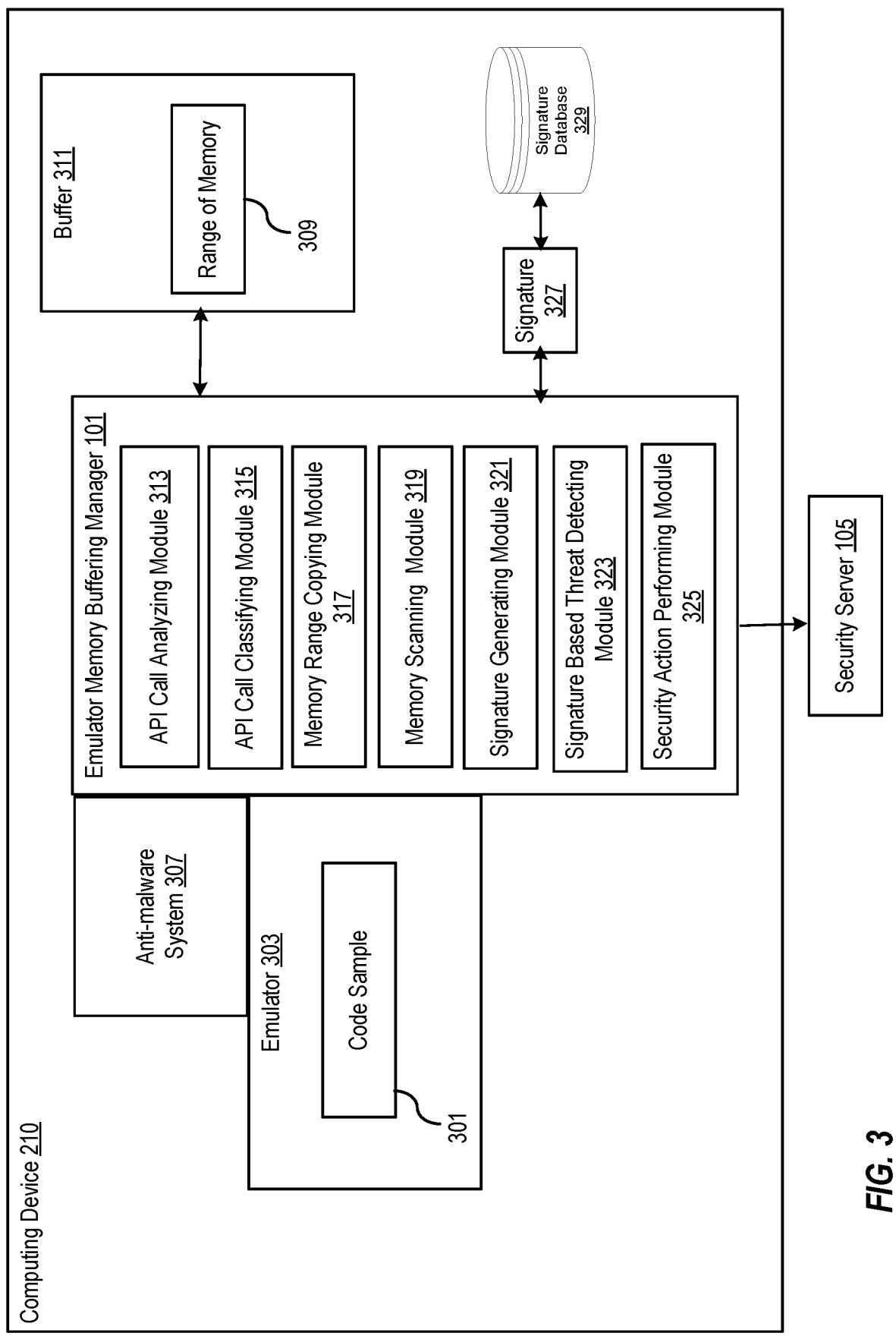
FIG. 3 is a high level block diagram of the operation of an emulator memory buffering manager, according to some embodiments.

FIG. 3 illustrates the operation of an emulator memory buffering manager 101, according to some embodiments. As described above, the functionalities of the emulator memory buffering manager 101 can reside on a client 103, a server 105, or be distributed between multiple computer systems 210, including within a cloud-based computing environment in which the functionality of the emulator memory buffering manager 101 is provided as a service over a network 107. FIG. 3 illustrates a specific multiple module instantiation of an emulator memory buffering manager 101, according to some embodiments. It is to be understood that although the emulator memory buffering manager 101 is illustrated as a single entity, the illustrated emulator memory buffering manager 101 represents a collection of functionalities, which can be instantiated as a single or multiple modules as desired (an instantiation of specific, multiple modules of the emulator memory buffering manager 101 according to one embodiment is illustrated in FIG. 3). It is to be understood that the modules of the emulator memory buffering manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the emulator memory buffering manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the emulator memory buffering manager 101 runs in conjunction with an emulator 303 and an anti-malware system 307 on a computing device 210. For clarity of explanation, in FIG. 3 the emulator memory buffering manager 101 is depicted as separate entity that is communicatively coupled with the emulator 303 and the anti-malware system 307. It is to be understood that in some embodiments, the emulator memory buffering manager 101 can be instantiated as part of the emulator 303 and/or anti-malware system 307.

As illustrated in FIG. 3, a code sample 301 is executed in an emulator 303, in order to perform malware analysis, and to generate a signature 305. An emulator 303 can be used for running untested/untrusted code in a controlled environment. For example, an emulator 303 can use sandboxing/virtualization technology to provide highly controlled access to a set of computing resources, while protecting the host computer 210 from being harmed by the code sample 301. Such emulation technology can be used to create an environment that mimics or replicates computing devices 210 targeted by suspected malware threats. In different embodiments, different variations of sandboxing, virtualization and/or debugging techniques can be used to implement the emulator 303 as desired.

As noted above, during the preparation stage malware typically makes one or more API calls. An API call analyzing module 313 of the emulator memory buffering manager 101 analyzes the API calls made by the code sample 301. Specific API calls and types of calls are empirically known to be made by malware during the preparation stage. An API call classification module 315 of the emulator memory buffering manager 101 can classify specific API calls as being sufficiently suspicious of being made by malware in this context so as to merit further analysis outside of the emulator 303. A range of memory 309 before and after API calls that are so classified can then be copied to a buffer 311 that is not accessible to the code sample 301 as described below. In preparation for executing the payload, malware tends to make API calls related to low level memory allocation (e.g., VirtualAlloc, VirtualAllocEx), low level memory mapping (e.g., mmap), resolving imports needed by the payload (e.g., LoadLibrary) and/or checking for debuggers (e.g., IsDebuggerPresent). In some embodiments, some or all of these or other API and/or certain types of APIs are classified as meeting a threshold level of suspicion of being called by malware. Which specific API calls or types of API calls to classify as being suspicious can vary between embodiments, and can be updated over time, for example based on new analysis data received from a centrally located security sever 105 or the like.

Note that many legitimate applications use these API calls in contexts unrelated to malware. It is desirable to avoid copying memory ranges 309 to a buffer 311 that is not accessible to the code sample 301 unnecessarily, where the API call is unrelated to malicious activity. For this reason, in some embodiments, the API call classification module 315 looks at additional factors concerning a given API call to determine whether to classify the specific instance of the call as sufficiently suspicious of having been made by malware so as to proceed with the corresponding buffering activity. More specifically, malware tends to call APIs in specific ways, using specific telltale arguments and the like, not typically used by benign code. For example, a call to resolve an import typically takes a string containing the label of the external module (e.g., the library or executable to be imported). In legitimate complied code, the call will be in code section, and the argument (the name of the external module) will be in the data section. In other words, the call to LoadLibrary will take an address of a string residing in the data section as an argument. By contrast, malware, which tends to be written as shell code, contains everything, including the argument specifying the module to be loaded, in the code. Thus, in some embodiments, the API call classification module 315 examines calls to resolve imports (and/or other types of API calls) made by the code sample 301 running in the emulator 303, and flags those in which data arguments are located in the code section instead of the data section.

Another example is that in order to call an API, compiled code tends to use the opcode for the calling instruction (e.g., call, jump, etc.), followed by an address in memory at which the subroutine or other code to be executed resides which is resolved at compile time. Because malicious shell code does not know at what address it or the payload will be loaded, it tends to use a register rather than an address in memory to point to the code to which to transfer execution (e.g., the subroutine to be called). Thus, in some embodiments, the API call classification module 315 examines calls to transfer the thread of execution, and flags those as suspicious that use a register rather than an address as the operand.

To give one more example, benign code typically returns to an address in the code section after an API call. In other words, benign code will use an address in the code section as the return address for an API call. Malicious shell code, on the other hand, will transfer control to external code and not return to the shell. Thus, in some embodiments, the API call classification module 315 examines call instructions, and flags those as suspicious that use a return address outside of the code section. These are just examples of factors that can trigger suspicion concerning a given API call. In some embodiments, any API call that is flagged according to any such factor is adjudicated as meeting a specific threshold level of suspicion of being called by malware, and a range of memory 309 before and after the return address is copied as described below. In other embodiments, each given factor is only taken as an indicator of susceptibility, and multiple factors can be required to cross the threshold level. In such environments, different factors can be weighted as desired. The specific threshold level of suspicion that triggers a copy is a variable design parameter.

For API calls determined to be sufficiently suspicious of having been made by malware during the preparation stage, a memory range copying module 317 of the emulator memory buffering manager 101 copies a range of memory 309 before and after the return address of the API call to a buffer 311 that is not accessible to the code sample 301. Note that the code sample 301 has a built in region of memory to wipe out after execution. Therefore, the buffer 311 can reside anywhere outside the wiped region, including, but not limited to, outside of the emulator 303. By copying a range of memory 309 before and after API call to the buffer 311, the memory range copying module 317 creates a back-up copy of the code and data before and after the API return address. The specific size of the range of memory 309 to copy is a variable design parameter that can be adjusted up or down between embodiments and under different circumstances. In one embodiment, two kilobytes before the API call return address and two kilobytes after are copied for each API call determined to be of interest, for a total of 4K per API call. This is just an example, and other sizes can be used in other embodiments as desired (e.g., 1K, 3K, 4K, etc. before and after). Note that where a given code sample 301 makes multiple API calls adjudicated to be sufficiently suspicious, multiple ranges of memory 309 are copied.

Recall that malicious code may overwrite itself to avoid detection even where the payload is not successfully executed. By copying the memory range 309 before and after each flagged API call to a buffer 311 which is not accessible to the code sample 301, this section of the code sample 301 is preserved, and can be analyzed later, after the emulation has finished. It is computationally expensive and logistically difficult to scan this range of memory 309 inside the emulator 303 in real-time when the API call is made, and if the code sample 301 is malware it may destroy it afterwards. By buffering the memory 309 out of reach of the code sample 301, the emulator memory buffering manager 101 can scan it after the emulation runs.

Thus, after the running of the code sample 301 in the emulator 303, a memory scanning module 319 of the emulator memory buffering manager 101 scans the buffer(s) 311 to which range(s) of memory 309 were copied during the emulation as described above. Note that the memory scanning module 319 can scan in one shot multiple ranges of memory 309 copied in conjunction with multiple API calls, after running a single code sample 301 in the emulator 303.

In conjunction with the scanning, a signature generating module 321 of the emulator memory buffering manager 101 generates a signature 327 based on contents of the buffer(s) 311. Recall that the memory before and after API calls adjudicated as being sufficiently likely to associated with the executing of the preparation (second) stage of malware is copied and scanned to generate the signature 327. Thus, in those instances in which the code sample 301 being run in the emulator 303 is in fact malware, the above described process results in the generation of a signature 327 based on the preparation stage of that instance of the malware. It is to be understood that the implementation mechanics of scanning memory and generating signatures 327 are known to those of ordinary skill in the relevant art, and their use within the context of the emulator memory buffering manager 101 will be readily apparent to those of such a skill level in light of this disclosure.

The signature 327 generated as described above can be used for signature based malware detection, in conjunction with the antimalware system 307. This can be done in several ways. A signature based threat detecting module 323 of the emulator memory buffering manager 101 can compare the generated signature 327 for the code sample 301 run in the emulator 303 to a database 329 of signatures of known threats, to determine whether the code sample 301 is malicious. In response to determining that the code sample is malicious, a security action performing module 325 of the emulator memory buffering manager 101 can take a security action, such as quarantining the code sample 301, deleting the code sample 301, sending an alert to a user or administrator, sending a notification to a centralized computer security server 105, etc.

In another embodiment, where the code sample 301 executed in the emulator 303 is itself determined to be malicious (e.g., through dynamic malware analysis during emulation and/or analysis of the content of the buffer(s) 311), the signature 327 generated from scanning the buffer(s) 311 can be used to identify additional instances of the threat. For example, the generated signature 327 can be provided to a centralized computer security server 105 and added to a signature database 329 or the like.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting malware, the method comprising:

analyzing, by a computing device, Application Programming Interface ("API") calls made by a code sample executing in an emulator that has controlled access to a set of computing resources;

classifying, by the computing device, an analyzed API call made by the code sample executing in the emulator as meeting a specific threshold level of suspicion of being made by malware;

responsive to classifying the API call made by the code sample executing in the emulator as meeting the specific threshold level of suspicion, preserving, by the computing device, a section of the code sample in a buffer from being wiped out by the execution of the code sample in the emulator, by copying the section of the code sample in a range of memory address before and after a return address of the classified API call to the buffer that is not accessible by the code sample executing in the emulator that has controlled access to the set of computing resources;

scanning, by the computing device, the section of the code sample preserved in the buffer that is not accessible to the code sample executing in the emulator;

generating, by the computing device, a signature corresponding to the code sample based on scanned contents of the buffer that is not accessible to the code sample executing in the emulator;

detecting an instance of malware by using the generated signature for signature based malware detection, by the computing device; and in response to detecting the instance of malware, performing at least one security action, by the computing device.

2. The method of claim 1 further comprising:
classifying, by the computing device, multiple analyzed API calls made by the code sample executing in the emulator as meeting the specific threshold level of suspicion of being made by malware;
for each specific separate one of the multiple API calls classified as meeting the specific threshold level of suspicion, copying, by the computing device, the section of the code sample in a separate range of memory before and after a return address of the classified API call to the buffer that is not accessible by the code sample executing in the emulator that has controlled access to the set of computing resources;
scanning, by the computing device, the buffer containing each separate copied range of memory;
generating, by the computing device, a single signature corresponding to the code sample, based on scanned contents of the buffer that is not accessible by the code sample executing in the emulator that has controlled access to the set of computing resources.

3. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call being a low level memory allocation API call.

4. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call being a low level memory mapping API call.

5. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call being an imports resolution API call.

6. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call taking a data argument located in a code section of the code sample executing in the emulator.

7. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call transferring execution to an address located in a register rather than in memory.

8. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call using a return address outside of a code section of the code sample executing in the emulator.

9. The method of claim 1 wherein classifying, by the computing device, an analyzed API call made by the code sample executing in the emulator as meeting a specific threshold level of suspicion further comprises:
classifying, by the computing device, a specific API call as meeting the specific threshold level of suspicion in response to the specific API call meeting multiple separate weighted factors.

10. The method of claim 1 wherein copying, by the computing device, the section of the code sample in a range of memory address before and after a return address of the classified API call to the buffer that is not accessible by the code sample executing in the emulator that has controlled access to the set of computing resources further comprises:
copying, by the computing device, the section of the code sample in two kilobytes of memory before the return address of the classified API call and the section of the code sample in two kilobytes of memory after the return address of the classified API call to the buffer out of reach of the code sample.

11. The method of claim 1 wherein detecting an instance of malware by using the generated signature for signature based malware detection, by the computing device, further comprises:
checking, by the computing device, the generated signature against a database of signatures of known threats; and
responsive to the generated signature matching an entry in the database, determining, by the computing device, that the code sample comprises malware.

12. The method of claim 1 wherein detecting an instance of malware by using the generated signature for signature based malware detection, by the computing device, further comprises:
determining, by the computing device, that the code sample comprises malware; and
using the generated signature to identify an additional instance of malware.

13. The method of claim 1 further comprising:
determining, by the computing device, that the code sample comprises malware; and
adding the generated signature to a database of signatures of known threats.

14. The method of claim 1 wherein performing at least one security action, by the computing device, further comprises:
quarantining the code sample, by the computing device.

15. The method of claim 1 wherein performing at least one security action, by the computing device, further comprises:
deleting the code sample, by the computing device.

16. The method of claim 1 wherein performing at least one security action, by the computing device, further comprises:
sending an alert to a user or administrator, by the computing device.

17. The method of claim 1 wherein performing at least one security action, by the computing device, further comprises:
sending a notification to a centralized computer security server, by the computing device.

18. At least one non-transitory computer readable-storage medium for detecting malware, the at least one non-transitory computer readable-storage medium storing computer executable instructions that, when loaded into computer memory and executed by at least one processor of a computing device, cause the computing device to perform the following steps:

analyzing Application Programming Interface ("API") calls made by a code sample executing in emulator that has controlled access to a set of computing resources;

classifying an analyzed API call made by the code sample executing in the emulator as meeting a specific threshold level of suspicion of being made by malware;

responsive to classifying the API call made by the code sample executing in the emulator as meeting the specific threshold level of suspicion, preserving a section of the code sample in a buffer from being wiped out by the execution of the code sample in the emulator, by copying the section of the code sample in a range of memory address before and after a return address of the classified API call to the buffer that is not accessible by the code sample executing in the emulator that has controlled access to the set of computing resources;

scanning the section of the code sample preserved in the buffer that is not accessible to the code sample executing in the emulator;

generating a signature corresponding to the code sample based on scanned contents of the buffer that is not accessible to the code sample executing in the emulator;

detecting an instance of malware by using the generated signature for signature based malware detection; and in response to detecting the instance of malware, performing at least one security action.

19. The at least one non-transitory computer readable-storage medium of claim 18 further storing computer executable instructions that, when loaded into computer memory and executed by at least one processor of a computing device, cause the computing device to perform the following steps:

classifying, by the computing device, multiple analyzed API calls made by the code sample executing in the emulator as meeting the specific threshold level of suspicion of being made by malware;

for each specific separate one of the multiple API calls classified as meeting the specific threshold level of suspicion, copying, by the computing device, the section of the code sample in a separate range of memory before and after a return address of the classified API call to the buffer that is not accessible by the code sample executing in the emulator that has controlled access to the set of computing resources;

scanning, by the computing device, the buffer containing each separate copied range of memory;

generating, by the computing device, a signature corresponding to the code sample, based on scanned contents of the buffer that is not accessible by the code sample executing in the emulator that has controlled access to the set of computing resources.

20. A computer system for detecting malware, the computer system comprising:

at least one processor;

system memory;

an emulator;

an API call analyzing module residing in the system memory, the API call analyzing module being programmed to analyze Application Programming Interface ("API") calls made by a code sample executing in the emulator that has controlled access to a set of computing resources;

an API call classifying module residing in the system memory, the API call classifying module being programmed to classify an analyzed API call made by the code sample executing in the emulator as meeting a specific threshold level of suspicion of being made by malware;

a memory range copying module residing in the system memory, the memory range copying module being programmed to preserve a section of the code sample in a buffer from being wiped out by the execution of the code sample in the emulator, by copying the section of the code sample in a range of memory address before and after a return address of the classified API call to the buffer that is not accessible by the code sample executing in the emulator that has controlled access to the set of computing resources, responsive to classifying the API call made by the code sample executing in the emulator as meeting the specific threshold level of suspicion;

a memory scanning module residing in the system memory, the memory scanning module being programmed to scan the section of the code sample preserved in the buffer that is not accessible to the code sample executing in the emulator;

a signature generating module residing in the system memory, the signature generating module being programmed to generate a signature corresponding to the code sample based on scanned contents of the buffer that is not accessible to the code sample executing in the emulator;

a signature based threat detecting module residing in the system memory, the signature based threat detecting module being programmed to detect an instance of malware by using the generated signature for signature based malware detection; and a security action performing module residing in the system memory, the security action performing module being programmed to perform at least one security action, in response to detecting the instance of malware.

* * * * *